May 7, 1963 G. M. CABBLE, JR., ET AL 3,088,557
BRAKE HEAD AND BRAKE SHOE ASSEMBLAGE FOR
COMPOSITION BRAKE SHOES
Filed June 29, 1960 2 Sheets-Sheet 1
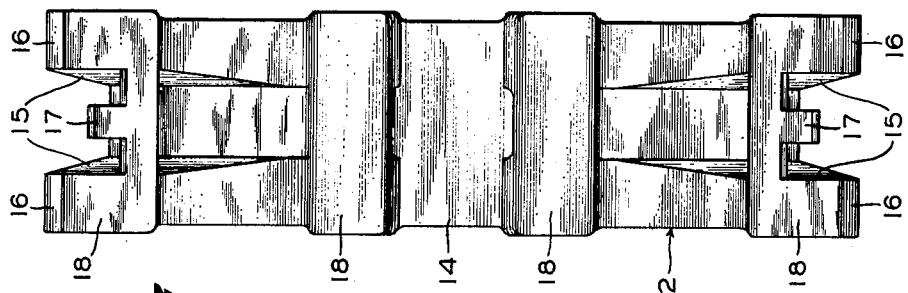
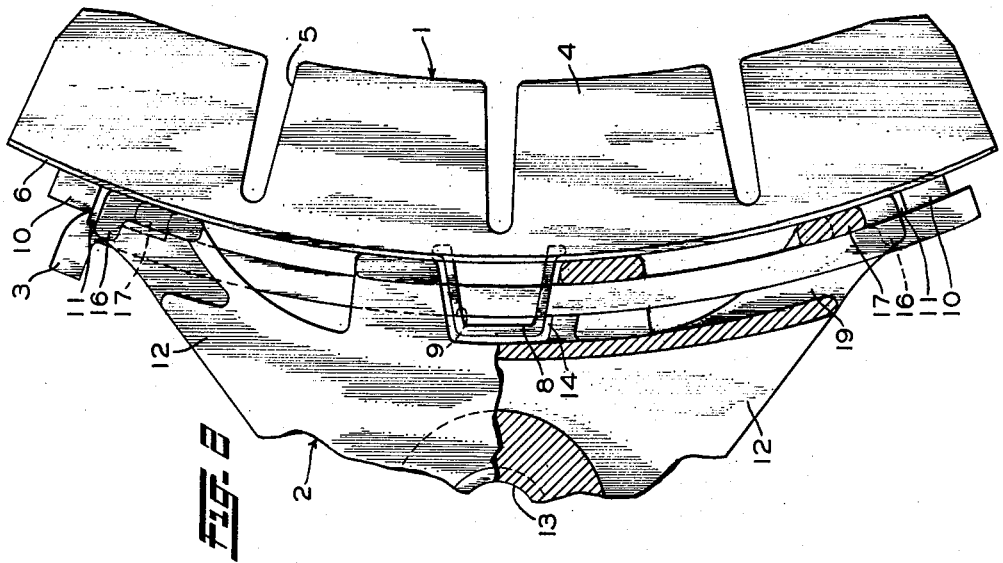
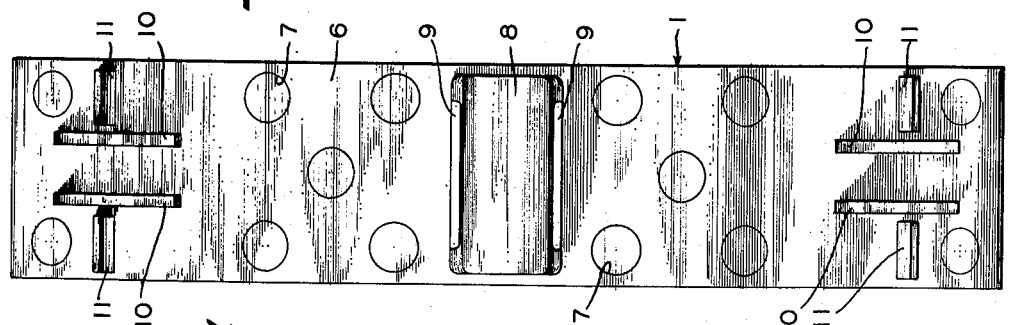
INVENTORS
George M. Cabble Jr.
BY Earl E. Allan
Attorney May 7, 1963  G. M. CABBLE, JR., ET AL  3,088,557
BRAKE HEAD AND BRAKE SHOE ASSEMBLAGE FOR
COMPOSITION BRAKE SHOES Filed June 29, 1960  2 Sheets-Sheet 2

INVENTORS
George M. Cabble Jr.
BY  Earl E. Allan
Attorney 3,088,557
BRAKE HEAD AND BRAKE SHOE ASSEMBLAGE
FOR COMPOSITION BRAKE SHOES
George M. Cabble, Jr., Pittsburgh, and Earl E. Allan, Monroe Heights, Pitcairn, Pa., assignors to Westinghouse Air Brake Company, Wilmerding, Pa., a corporation of Pennsylvania
Filed June 29, 1960, Ser. No. 39,522
5 Claims. (Cl. 188—243)

This invention relates to a novel brake head and brake shoe assemblage for composition brake shoes of the type utilized in railway locomotive and car brake systems and more particularly relates to an assemblage of the above type in which the brake head is constructed for the accommodation of composition brake shoes only, and especially to prevent installation of cast iron brake shoes thereon.

The separate brake head element and composition brake shoe element constituting the novel assemblage, will hereinafter be referred to on occasion, respectively, as the "new brake head" and the "new composition brake shoe" to distinguish these elements from the corresponding standard types for purposes of clarity.

In railway car brake systems two types of brake shoes are in common use, namely, composition brake shoes and cast iron brake shoes. These two types of brake shoes have different frictional characteristics, respectively.

Composition brake shoes, in which the blocks are constructed of composition material, provide a higher frictional force per unit area than do cast iron brake shoes. To provide substantially equivalent and uniform braking forces, regardless of the type of brake shoes employed so as to compensate for the different frictional characteristics of composition and cast iron brake shoes, railway locomotives and cars which are intended to carry composition brake shoes are provided with brake cylinders of smaller diameter than the brake cylinders customarily used on cast iron brake shoe equipped installations since the smaller diameter brake cylinder provides a lesser total braking force for a given unit fluid pressure acting on the brake cylinder piston. The smaller brake applying force exerted on the composition brake shoes is designed to provide substantially the same braking force on the wheel as does the larger brake applying force exerted by the larger diameter brake cylinder on the cast iron brake shoes, thus compensating for the different frictional characteristics of the shoes.

It is important, in railway locomotive and car applications, that brake shoes be matched with their corresponding brake cylinders for the reason that substitution of cast iron brake shoes in a system constructed for use with composition brake shoes provides inadequate braking, and substitution of composition brake shoes for cast iron brake shoes in a brake system constructed for use with cast iron brake shoes may result in over-braking. But, due to the fact that existing composition brake shoes and cast iron brake shoes are so constructed as to be interchangeably installed on a standard type brake head, it is possible that through inadvertence one type of brake shoe may be substituted for another, upon replacement of a worn shoe with a new shoe.

Proposals have been made for constructing brake heads and brake shoes specifically designed to fit each other only, thus making it impossible to interchange a composition brake shoe for a cast iron brake shoe and vice versa. These proposals, however, involve costly machining operations and other high cost manufacturing processes.

It is to be observed that when cast iron brake shoes are provided in replacement of worn composition type shoes, damage to equipment and injury to passengers may result from the inadequate braking provided by the cast iron shoes, whereas, when composition type brake shoes are provided in replacement of cast iron type shoes, the overbraking which may result is not necessarily hazardous and is tolerable. It is possible, therefore, to provide a simplified arrangement for accomplishing, at relatively low cost, the safety-insuring functions of prior arrangements or methods, namely that of preventing substitution of cast iron type brake shoes for composition type brake shoes, by avoiding the provision for means to insure against substitution of composition type brake shoes for cast iron brake shoes.

Accordingly, it is an object of this invention to provide means simple in construction and of relatively low cost for preventing substitution of cast iron brake shoes in a composition brake shoe system.

It is a further object of this invention to provide a novel brake head and composition brake shoe assemblage in which the brake head element of novel design and the composition brake shoe element of novel design are so constructed as to cooperatively fit together to permit installation of only the composition brake shoe on the brake head, while still permitting installation of the novel composition brake shoe upon a standard type brake head of the type suited to receive a cast iron brake shoe thereon.

According to the invention, the novel brake head and composition brake shoe assemblage comprises a brake head element similar in construction to the standard type having a concave brake shoe receiving surface with end slots for receiving guide lugs on the brake shoe to interlock the brake shoe and brake head, but characterized in that a lug or tang is formed on or attached to the brake head body to block entry of the guide lugs on a standard type cast iron brake shoe into the end slots for preventing installation of the latter thereon. In addition, the composition brake shoe element of the assemblage is characterized over prior art structures in that a plurality of spaced parallel longitudinally extending guide members are provided at each end of the backing plate for the brake shoe so as to straddle the tang in the end slots on said brake head and in that a plurality of transversely extending stop members are also provided at each end of the backing plate for engagement with the end toes on the brake head. The parallel guide members and the transversely extending stop members are so positioned on the backing plate as to permit installation of the new composition brake shoe on a standard brake head.

In the accompanying drawings, FIG. 1 is a view of the new composition brake shoe, showing the construction of the backing plate.

FIG. 2 is a side view, partially in section, showing the new composition brake shoe mounted on the new brake head and secured thereto by a key, with part of the brake head broken away.

FIG. 3 is a view, showing the concave brake shoe receiving face of the brake head shown in FIG. 2.

*Description*

Figure 6:
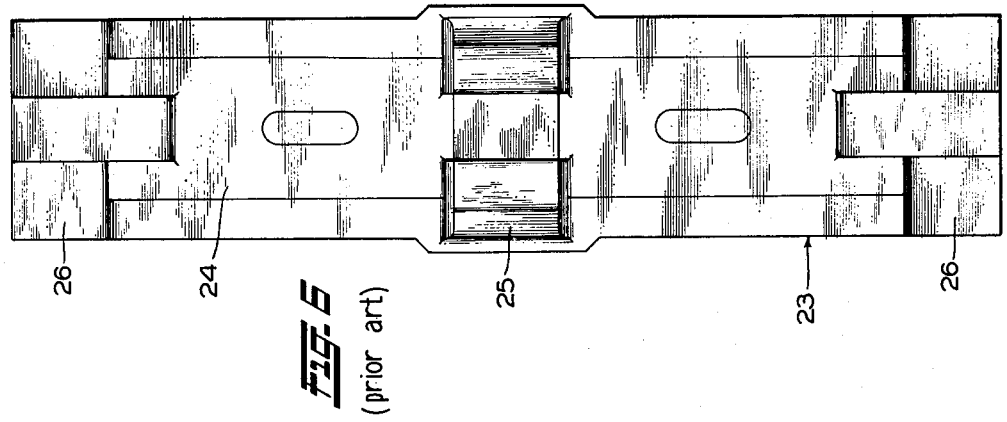
FIG. 6 is a view, showing the backing plate side of a conventional standard type cast iron brake shoe well known in the prior art.

Referring to FIG. 2 of the drawings, the brake head and brake shoe assemblage embodying the invention comprises a composition brake shoe 1 installed and locked on a brake head 2 by a tapered retainer key 3.

The composition brake shoe 1, FIG. 1 and 2, comprises a body or block 4, of composition material and segmented construction, having a concave frontal surface corresponding to the curvature of the tread of a railway car wheel to provide full contact of the block with the tread of the wheel on a railway car. A plurality of spaced vents 5 between the segmented portions of the block 4 extend inwardly from the frontal surface and serve to assist in dissipating the heat developed in the block on brake applications.

A metal backing plate 6 is anchored to the back surface of block 4 opposite the frontal surface, incidental to the molding of the block, by pressing the composition material into a plurality of round openings 7 formed in the backing plate 6.

Backing plate 6 has, equidistant from its ends, an attaching key lug 8 secured by welding or by interlocking engagement therewith as illustrated in FIG. 2. A keyway or perforation 9 is provided through lug 8.

A pair of spaced parallel longitudinally extending guide members 10 and a pair of transversely extending stop members 11 are welded edgewise to backing plate 6 at each end thereof. Each pair of parallel guide members 10 is positioned in the space between a corresponding pair of transverse stop members 11 and is disposed symmetrically on opposite sides of the longitudinal center line of the backing plate 6.

Brake head 2, FIGS. 2 and 3, has a concave brake-shoe receiving face corresponding to the curvature of backing plate 6 of the brake shoe. Extending rearwardly from the side opposite the concave face of the brake head 2 is a pair of longitudinal spaced side members 12 that are connected to each other and reinforced by transverse webs. At their outer ends members 12 are connected by a boss through which extends a bore or aperture 13 for receiving a pin adapted to pivotally attach the brake head to a brake hanger in the usual manner.

A cavity 14, for receiving lug 8 of the brake shoe is formed centrally within the brake-shoe receiving face of brake head 2, and an inwardly extending end slot 15 is formed between a corresponding pair of end toes 16 formed at each end of the body of brake head 2. A tang 17, of smaller width than the space between the longitudinal guide members 10 on the brake shoe, is cast integrally with the brake head and extends outwardly from the body of the brake head into each end slot 15 between the end toes 16. A plurality (shown as four) of longitudinally spaced bearing surfaces 18 are formed on the receiving face of the brake head to provide an engaging surface for backing plate 6 of the brake shoe.

A channel 19, for receiving retainer key 3, extends longitudinally through brake head 2 between the longitudinal side members 12 in intersecting relation to the cavity 14.

Brake shoe 1 is installed on the brake head 2 in a manner similar to the usual manner. Lug 8 of brake shoe 1 is inserted into cavity 14 of brake head 2 and longitudinal guide members 10 are inserted into the end slots 15 in straddling relation to tangs 17. When thus installed, backing plate 6 will seat firmly on the bearing surfaces 18 of the receiving face of the brake head, and each transverse stop member 11 will abut a respective end toe 16. Key 3 is then inserted into the upper end of channel 19 and through the keyway 9 of lug 8, thereby locking the brake shoe to the brake head.

Transverse stop members 11 serve to keep brake shoe 1 from longitudinal displacement while longitudinal guide members 10 serve to keep the brake shoe from moving laterally on the brake head 2, the members 10 also acting as guides.

Figure 5:
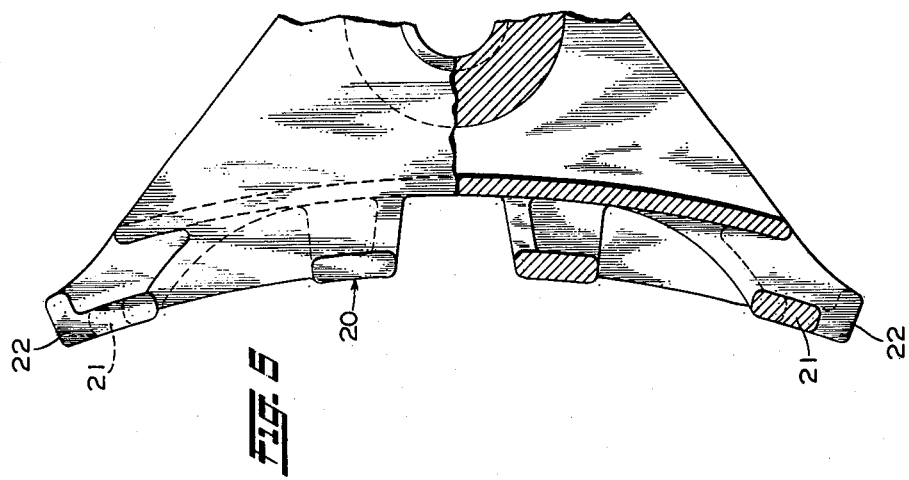
FIG. 5 is a side view, partly in section, of the modified standard brake head of FIG. 4 with a portion broken away.
Figure 4:
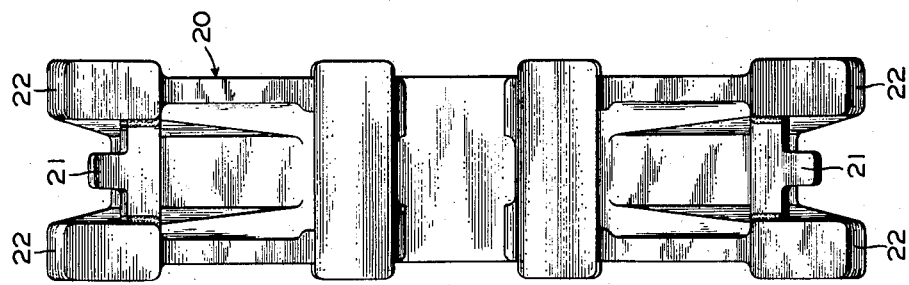
FIG. 4 is a view, showing the concave brake-shoe receiving face of a standard type brake head modified according to the invention to prevent installation of a cast iron brake shoe thereon and to permit installation of the new composition brake shoe thereon.

FIGS. 4 and 5 show a modified standard brake head 20 similar in construction to the brake head 2, but differing therefrom in that a separately formed tang 21, corresponding to tang 17 of brake head 2, is welded between and to the pair of end toes 22 and extends outwardly from the usual slot at each end of the brake-shoe receiving face of a standard brake head as distinguished from tang 17 which is cast integrally with the brake head 2. It will be apparent that, if desired, a tang 17 or 21 may be provided at only one end of a brake head, as distinguished from both ends of the brake head, although provision of a tang at both ends of a brake head is preferred.

FIG. 6 shows the construction of the backing plate side on a standard cast iron brake shoe 23 which comprises in addition to a backing plate 24 and an attaching lug 25, a T-shaped stop and guide member 26 at each end thereof formed above the surface of the backing plate 24. The standard cast iron brake shoe 23 is designed to be mounted on a standard type brake head. As will be seen from FIG. 4, the standard type brake head is similar to the modified brake head 20 but is not provided with tangs 21. Thus when the standard cast iron brake shoe 23 is mounted on a standard brake head, the cross-arms on the T-shaped members 26 of brake shoe 23 normally abut against the ends of the end toes and the center arm or guide arm extends into the recess or end slot between the end toes in close fitting relation.

Due to the construction of a standard cast iron brake shoe 23, as explained, should an attempt be made to install such a brake shoe on either the new brake head 2 or on the modified brake head 20 shown in FIG. 4, the tangs 17 and 21 respectively on these brake heads would block entrance of the longitudinal portion of the T-shaped stop member 26 into the slot between the end toes and thus prevent installation thereon.

It will be noted that construction of the new composition brake shoe 1 also permits installation of the brake shoe 1 on the standard type brake head, with or without tangs 21, since the longitudinal guide members 10 on the backing plate 6 of brake shoe 1 are positioned to fit into the end slots 15 between toes 22, and transverse stop members 11 abut the outer ends of the toes. If the ends of the brake head are provided with tangs, the guide members 10 on the composition type brake shoes straddle the tangs while entering the end slots. If no tangs are provided, as is the case with a standard brake head for a cast iron shoe, the guide members 10 on the composition brake shoe 1 also enter into the slot between the end toes 22 and lock the brake shoe against lateral movement with respect to the brake head.

Having now described our invention, what we claim as new and desire to secure by Letters Patent, is:

1. A brake head and brake shoe assemblage for use in a railway car brake system, said assemblage comprising a brake head and a composition brake shoe adapted to be secured to the brake head, said brake head being characterized in that it has a tang extending into the slot formed between a pair of laterally spaced end toes located at each end of the brake head, and said composition brake shoe being characterized in that it has a backing plate having at each end thereof a pair of laterally spaced longitudinally extending guide members and a pair of transversely extending stop members, said logitudinally extending guide members and said transversely extending stop members being positioned such that upon installation of said composition brake shoe on said brake head, said longitudinally extending guide members straddle said tangs on said brake head for preventing lateral dispacement of said composition brake shoe on said brake head and each of said transversely extending stop members abuts the outer end of a respective end toe of said brake head, for preventing longitudinal displacement of said composition brake shoe on said brake head, said guide members being relatively positioned upon said backing plate to be received without obstruction between the laterally spaced end toes of a standard brake head intended to receive a standard cast iron brake shoe, said composition brake shoe being further characterized in that said longitudinally extending guide members are each in the form of a relatively thin rectangular strip secured in substantially perpendicular relation to the backing plate, and arranged in parallel relation to each other symmetrically on opposite sides of the longitudinal center line of the backing plate in a manner to fit within the end slot between the end toes at each end of a standard brake head.

2. A brake head and brake shoe assemblage for use in a railway car brake system, said assemblage comprising a brake head and a composition brake shoe adapted to be secured to the brake head, said brake head being characterized in that it has a tang extending into the slot formed between a pair of laterally spaced end toes loacted at each end of the brake head, and said composition brake shoe being characterized in that it has a backing plate having at each end thereof a pair of laterally spaced longitudinally extending guide members and a pair of transversely extending stop members, said longitudinally extending guide members and said transversely extending stop members being positioned such that upon installation of said composition brake shoe on said brake head, said longitudinally extending guide members straddle said tangs on said brake head for preventing lateral displacement of said composition brake shoe on said brake head and each of said transversely extending stop members abuts the outer end of a respective end toe of said brake head, for preventing longitudinal displacement of said composition brake shoe on said brake head, said guide members being relatively positioned upon said backing plate to be received without obstruction between the laterally spaced end toes of a standard brake head intended to receive a standard cast iron brake shoe, said composition brake shoe being further characterized in that said longitudinally extending guide members are each in the form of a relatively thin rectangular strip secured in substantially perpendicular relation to the backing plate, and arranged in parallel relation to each other symmetrically on opposite sides of the longitudinal center line of the backing plate in a manner to fit within the end slot between the end toes at each end of a standard brake head, and in that said transversely extending stop members are each in the form of a relatively thin rectangular strip secured in substantially perpendicular relation to the backing plate and arranged symmetrically on opposite sides of said longitudinally extending guide members.

3. A brake head and brake shoe assemblage for use in a railway car brake system, said assemblage comprising a brake head and a composition brake shoe adapted to be secured to the brake head, said brake head being characterized in that it has a tang extending into the slot formed between a pair of laterally spaced end toes located at one end of the brake head, and said composition brake shoe being characterized in that it has a backing plate having at each end thereof a pair of laterally spaced longitudinally extending guide members and a pair of transversely extending stop members, said longitudinally extending guide members and said transversely extending stop members being positioned such that upon installation of said composition brake shoe on said brake head, said longitudinally extending guide members straddle said tang on said brake head for preventing lateral displacement of said composition brake shoe on said brake head and each of said transversely extending stop members abuts the outer end of a respective end toe of said brake head, for preventing longitudinal displacement of said composition brake shoe on said brake head, said guide members being relatively positioned upon said backing plate to be received without obstruction between the laterally spaced end toes of a standard cast iron shoe receiving brake head without being obstructed, further characterized in that each tang of said brake head, by extending into the slot formed at each end of said brake head between the end toes, blocks entry into the slot of a corresponding guide lug formed on the backing plate of a standard cast iron brake shoe for preventing installation of the latter on said brake head and insures that only the said composition brake shoe may be installed on the said brake head.

4. A brake head and brake shoe assemblage as claimed in claim 3, further characterized in that each tang extends symmetrically on a longitudinal center line of said brake head into the corresponding slot between the end toes, each tang being of substantially lesser width than the width of the corresponding slot between the end toes to provide a space between the tang and each end toe into which a corresponding one of said longitudinally extending guide members extends, upon installation of said composition brake shoe on said brake head.

5. A brake head and brake shoe assemblage as claimed in claim 3, said longitudinally extending guide members fitting within the slot and a respective one of said transversely extending stop members abutting the outer end of a respective end toe of the standard brake head.

References Cited in the file of this patent

UNITED STATES PATENTS

| | | |
|---|---|---|
| 2,762,468 | Bachman | Sept. 11, 1956 |
| 2,900,711 | Wilson | Aug. 25, 1959 |
| 2,902,752 | Keating et al. | Sept. 8, 1959 |
| 2,948,361 | Pogue | Aug. 9, 1960 |
| 2,974,759 | Tack et al. | Mar. 14, 1961 |